United States Patent [19]

Stephenson

[11] 3,815,092

[45] June 4, 1974

[54] CODING AND DECODING METHOD AND APPARATUS

[75] Inventor: Richard D. Stephenson, Randolph, N.J.

[73] Assignee: Universal Technology Inc., Verona, N.J.

[22] Filed: May 21, 1973

[21] Appl. No.: 362,044

[52] U.S. Cl. .................................. 340/147 P, 178/1

[51] Int. Cl. .............................................. H04q 9/00

[58] Field of Search ................. 340/147 P, 166, 167

[56] References Cited

UNITED STATES PATENTS

| | | | |
|---|---|---|---|
| 3,229,253 | 1/1966 | Logue | 340/166 R |
| 3,371,320 | 2/1968 | Lachenmayer | 340/166 R |
| 3,540,033 | 11/1970 | Crawford | 340/166 R |
| 3,560,941 | 2/1971 | Wallace, Jr. | 340/166 R |
| 3,641,557 | 2/1972 | Starr | 340/166 R |

*Primary Examiner*—Donald J. Yusko
*Attorney, Agent, or Firm*—Pennie & Edmonds

[57] ABSTRACT

A method and apparatus are described for coding and decoding the signals used in a communication system. The coding apparatus comprises an input means, at least two programmable coding matrices connected in parallel to the input means, and a code character generator connected to each coding matrix. Each coding matrix comprises a first plurality of input leads, a second plurality of output leads, and selective connections between the input leads and the output leads so that each input lead is connected to one output lead. The parallel combination of coding matrices and character generators provides for a very large number of possible code characters. The decoding apparatus comprises a register, at least two decoding stages connected to the register, each of which converts a portion of a signal of MARKS and SPACES into an output on one of a plurality of leads, means for monitoring at least one lead from each decoding stage for the coincidence of a signal on each tested lead, and programmable means for connecting the output of the decoding stages to the monitoring means.

With appropriate input means and coding matrices, the coding apparatus can be used to generate the calling codes used for control of the communication system. The programmable coding matrices and connecting means can also be used in the coding and decoding stages of data communication.

13 Claims, 2 Drawing Figures

CODING AND DECODING METHOD AND APPARATUS

BACKGROUND OF THE INVENTION

The present invention was devised for use in a teletypewriter contention system in which each station in the network can activate by individual address codes selected stations in the network whenever a common communication link between them is free of signal traffic. In the typical operation sequence, an operator at one station pushes a "start" button on a control panel to turn on the station motor and activate the station printer. A code is then sent to all stations in the system to prevent them from initiating other communications. This code also lights a busy lamp on the teletypewriter control panel at all the other stations.

Next, the originating station sends from its keyboard or tape input the calling codes of the stations between which communication is sought. As each station is called, its motor is turned on; and, if the station is equipped with an answerback unit, an answerback signal is transmitted to the originating station where it is printed. After all the stations are called with which communication is desired, an end-of-address code is sent. This code prevents all the uncalled stations from being called if their call characters occur in subsequent message traffic and turns on the printers of the stations that have been called.

Message traffic can then be sent in both directions on the system. Any one of the stations that has been called may enter data into the common communication link and all the called stations, including the transmitting station, will print this data. When communication is completed, an end-of-transmission code turns all station motors and busy lights off.

As is well known, all communication in such a system is digital and all signals are sequences of MARKS and SPACES. Each station must have means for generating the sequences of MARKS and SPACES that constitute the calling codes of the other stations to which it is connected and it also must have means for recognizing its own calling code. Because individual systems frequently use calling codes of different lengths, it is desirable from the manufacturing standpoint to have some standardized means of conveniently assembling and inexpensively manufacturing the coding apparatus in a station no matter what length of calling code be used. For the same reason, it is also desirable to use standardized decoding apparatus, a desideratum that is further complicated by the fact that each station typically has a unique calling code assigned to it.

Where human intervention in the system is desired, provision is made for coding alphanumeric characters into MARKS and SPACES and for decoding MARKS and SPACES into alphanumerc characters. A teletypewriter and appropriate circuitry provide this capability at every station where they are located. As is well known, there are many different teletypewriter systems available; the number of different alphanumeric characters that can be used in a system depends on the type of teletypewriter used; and the particular character represented by a given sequence of MARKS and SPACES can be varied by altering the wiring of the coding or decoding circuitry.

In the past, the sequences of MARKS and SPACES representative of calling codes or alphanumeric data have typically been generated with the aid of a diode matrix such as that shown in U.S. Pat. No. 3,551,616. The use of a diode matrix, however, adds considerable expense to the coding apparatus because the diodes have to be installed by hand in order to provide the particular coding desired by the user. Needless to say, it is also quite expensive to repair such a coding matrix or to change one once it is installed. If, instead, standard diode matrices are used, the user's choice of system components is limited because the coding matrices designed by one manufacturer for his equipment frequently are not pin-to-pin compatible with the equipment of another manufacturer.

The decoding of MARK and SPACE signals is typically carried out using standard decoding logic stages such as shown at pages 5–6 to 5–13 of the *TTL Integrated Circuits Catalog from Texas Instruments* and at pages 381 and 382 of *MOS Integrated Circuits*, W. M. Penney (ed.) (VanNostrand Reinhold 1972). Signals representative of calling codes may then be recognized by apparatus commonly known as sequencers and signals representative of alphanumeric data can be applied to the printer control circuitry of a teletypewriter. The use of standard logic stages, however, invariably limits the nature of the coding that can be used in a customer's equipment. Again, it also limits the type of components that can be used because of the need for pin-to-pin compatibility.

SUMMARY OF THE INVENTION

To standardize the manufacture and assembly of coding and decoding apparatus as much as possible, a method and apparatus have been devised in which standardized logic circuitry is used in conjunction with programmable connector boards to provide flexibility in selecting codes. The coding apparatus of an illustrative embodiment of the invention comprises an input means, at least two programmable coding matrices connected in parallel to the input means, and a code character generator connected to each coding matrix. Each coding matrix comprises a first plurality of input leads, a second plurality of output leads, and selective connections between the input leads and the output leads so that each input lead is connected to one output lead. The parallel combination of coding matrices and character generators provides for a very large number of possible code characters.

The decoding apparatus comprises a register, at least two decoding stages connected to the register, each of which converts a portion of a signal of MARKS and SPACES into an output of one of a plurality of leads, means for monitoring at least one lead from each decoding stage for the coincidence of a signal on each tested lead, and programmable means for connecting the output of the decoding stages to the monitoring means.

By using programmable coding matrices, it is possible to vary at will the number of different alphanumeric characters that can be used in the system and the particular sequence of MARKS and SPACES that is produced in response to an input on a given load. The large number of different alphanumeric characters that can be coded permits the convenient selection of different subsets of characters by different customers as their needs may dictate. The ability to vary the sequence of MARKS and SPACES produced by a given input permits the coding matrix to be used as an interface between the input and the code character generator, thereby permitting the use of various inputs and code generators that are not pin-to-pin compatible.

The programmable coding matrices may also be used to generate the different calling codes of the stations that are linked together in a communication network. In this application, an appropriate input means applies signals in succession to the different input leads to the coding matrices. In each different coding matrix, the input leads are selectively connected to the output leads so that signals on the input leads are connected to those output leads that will produce from the code character generators the desired sequences of MARKS and SPACES that constitute the calling code of a particular station. Thus, each station in a network may be called simply by inserting in the coding apparatus the coding matrix that is unique to it and applying signals successively to the input leads of the matrix.

The use of programmable means for connecting the output of the decoding stages to the testing means similarly permits the use of decoding components that are not pin-to-pin compatible. These programmable means also permit the use of standardized calling code testing means even when different calling codes are used for the different stations in a system.

BRIEF DESCRIPTION OF THE DRAWING

These and other objects, features, and elements of this invention will be more readily apparent from the following detailed description of the drawing in which.

DETAILED DESCRIPTION OF THE DRAWING

A conventional private communication system in which this invention is typically used comprises at least three stations linked together by a communication link such as a private telephone line or a radio network. Each station typically includes both a transmitted and a receiver and means for establishing communication selectively with the other stations in the system. Typical apparatus include teletype models 28, 32, 33, 35, and 37 in an AT&T 83A1 or Western Union Series A Tieline Contention System. The coding and decoding method and apparatus of this invention replaces the system used in this prior art for selecting the stations that are linked for communication. It is compatible with the remainder of this communication equipment and can readily be connected to it by one familiar with this art. For this reason, details of the conventional parts of the apparatus will not be discussed.

The coding and decoding method and apparatus of this invention may also be used in place of conventional apparatus to code alphanumeric data into MARK and SPACE signals and to decode such signals. Again, this is compatible with the remainder of such communication equipment and can readily be connected to it.

Figure 1:
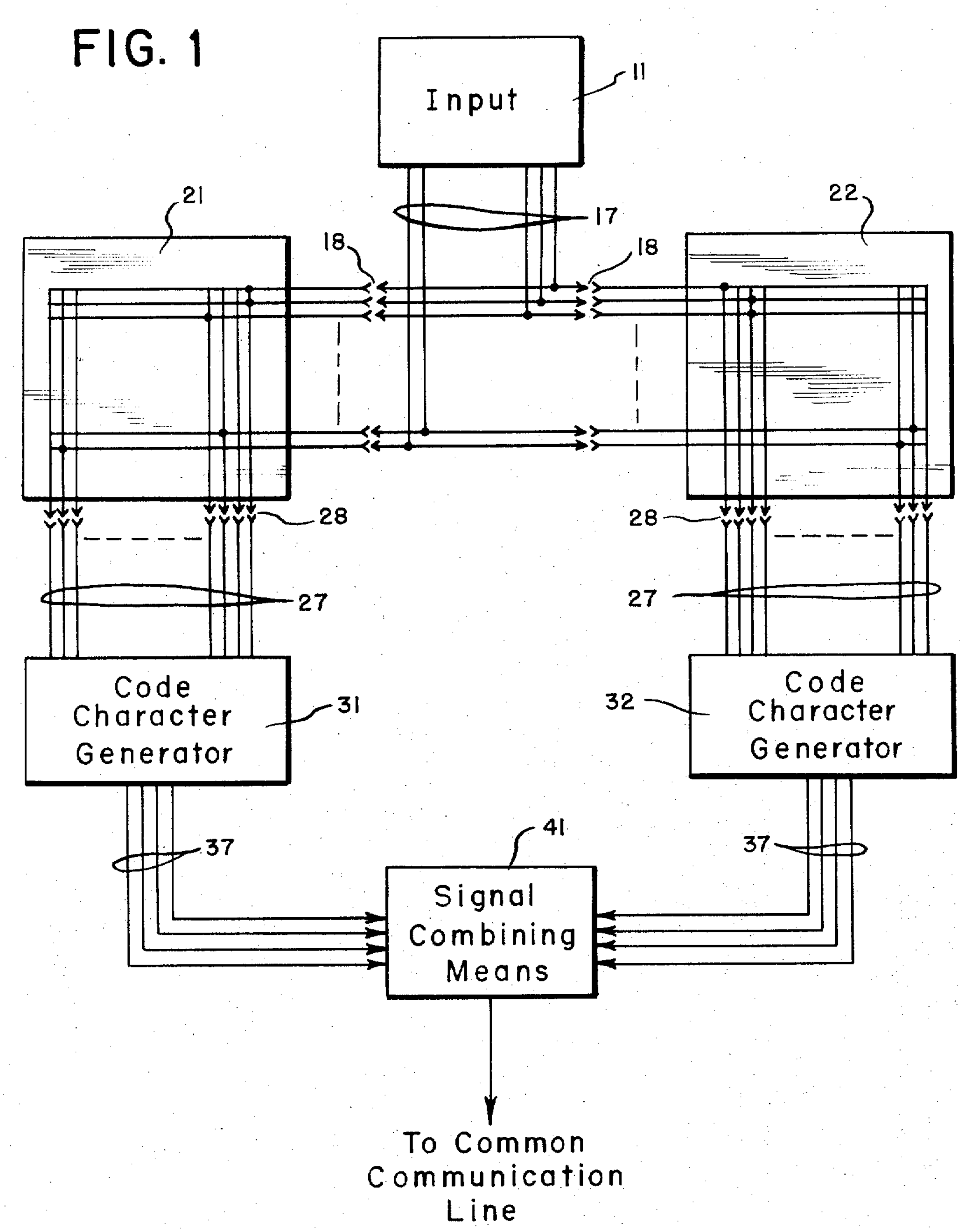
FIG. 1 is a schematic illustration of illustrative coding apparatus according to the invention.

The coding apparatus of FIG. 1 comprises an input 11, two coding matrices 21, 22, two code character generators 31, 32, and signal combining means 41. For generation of calling codes, input 11 may be a commutator that supplies signals successively to different leads 17 from input 11. Input 11 is connected to coding matrices 21, 22 by the set of leads 17 each of which has one input to matrix 21 and one input to matrix 22. Each matrix 21, 22 also has a set of output leads 27. Within each coding matrix, there are selective ohmic connections between leads 17 and leads 27. Specifically, each input lead is connected to one output lead, as a result of which signals on the different input leads are formed into coded signals on the output leads. Thus, in the preferred embodiment shown in FIG. 1, a signal on each input lead is coded into the form of output signals on a pair of leads, one from each of the two coding matrices.

The coding matrices are mounted on a circuit board. Advantageously, input leads 17 are disposed on one side of this board and output leads 27 on the other side with the selective connections being made through holes in the board. For convenience, both coding matrices can be mounted on a single board. As will be explained below, it is desirable to be able to connect different coding matrices to the input means and code character generators in order to generate different calling codes. To facilitate the insertion of the coding matrices into the apparatus and their removal therefrom, connecting plugs 18, 28 are provided in leads 17, 27, respectively.

Each matrix 21, 22 is connected to a code character generator 31, 32 by a set of leads 27. Each code character generator 31, 32 contains sufficient logic circuitry so as to code an input on any one of its input leads 27 into a unique sequence of MARKS and SPACES. For example, if there are sixteen leads 27 into a code character generator, an input on one of the leads 27 may be coded by four AND gates into a unique four-bit sequence of MARKS and SPACES. Each such AND gate has eight inputs selected from the sixteen leads 27 into the code character generator. An illustrative connection scheme can be devised by numbering the sixteen leads 27 from zero to fifteen in the binary number system. The eight inputs to the first AND gate are those eight leads of the sixteen leads 27 whose binary representation has a one in the right-hand column; the eight inputs to the second AND gate are those eight leads having a one in the next column to the left; and so on.

The output of each code character generator 31, 32 is fed by leads 37 to signal combining means 41. Means 41 combines the output of the two code character generators 31, 32 into a sequence of MARKS and SPACES. Inasmuch as the output of each code character generator 31, 32 and the generators themselves are in parallel, an input on one of leads 17 will produce two sets of MARKS and SPACES that all arrive simultaneously at signal combining means 41. Accordingly, combining means 41 constitutes a parallel-to-serial converter such as the Universal Asynchronous Receiver Transmitter (UART) S 1757 manufactured by American Micro-Systems and others. For the example of sixteen input leads to each code character generator, an input signal on one of input leads 17 is coded into a unique eight-bit code. There are of course 256 different possible eight-bit codes and therefore up to 256 different possible code characters.

Typically, the calling code for each station contains more than one code character. These additional characters are generated in similar fashion simply by applying signals from the commutator to additional input leads to the coding matrices that are selectively connected to the appropriate leads to the code character generators that produce the desired sequences of MARKS and SPACES. Thus, the complete group of MARKS and SPACES that constitute a calling code may be generated by using the commutator of the input means to apply signals successively to each of input leads 17. These signals are successively connected by the coding matrices 21, 22 to the appropriate leads 27 that cause the formation of the desired sequences of MARKS and SPACES that make up the characters in the calling code. There can be as many characters in the calling code as there are different input leads. From the manufacturing standpoint, it is desirable to make coding matrices having as many input leads as anyone would ever be likely to need and to connect only as many leads as are required for a particular customer's application.

To generate the calling codes of different stations, different pairs of coding matrices 21, 22 are used. All these pairs of matrices have the same construction with the only difference being the fact that the connections between the input leads 17 and output leads 27 are varied in order to produce the different sequences of MARKS and SPACES representative of the different code characters in the different calling codes. To call a series of stations, an operator simply selects the pairs of coding matrices that generate the calling codes of the stations with which he desires to communicate. Each pair of coding matrices is then connected in turn to the input means and code character generators and signals are applied to the input leads to the pairs of coding matrices from the commutator of the input means.

Each code of MARKS and SPACES that is formed is applied to the common communication link and transmitted to all the other stations that are connected to this link. The calling codes that are transmitted are received at each of the stations and are decoded. If the code sent corresponds to that of one of the stations, the motor of that station is turned on; and if the station is so equipped, an answerback signal is transmitted. Coded alphanumeric data may then be transmitted to those stations that are operating. Upon receipt at these stations, the data may be decoded using some of the same apparatus for decoding and recognizing the calling code.

Figure 2:
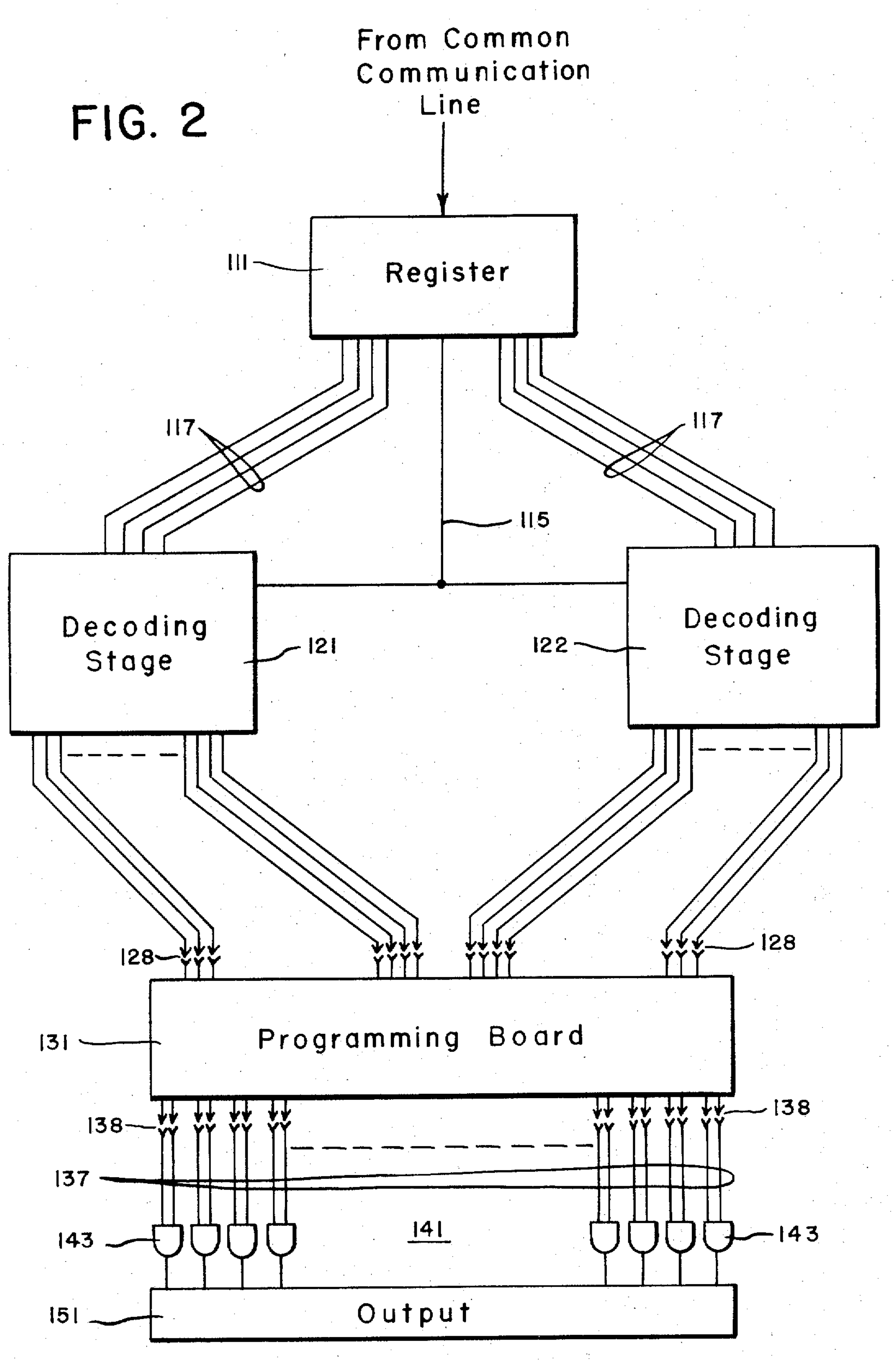
FIG. 2 is a schematic illustration of illustrative decoding apparatus according to the invention.

Illustrative decoding apparatus used at a station receiving a code is shown in FIG. 2. This apparatus comprises a register 111, two decoding stages 121, 122, a programming board 131, a character recognition circuit 141 and an output 151. Register 111 and control circuit 115 constitute a serial-to-parallel converter that applies a received signal of MARKS and SPACES to decoding stages 121, 122 via leads 117. Inasmuch as each station typically has both a transmitter and a receiver, register 111 is preferably the receiver half of the UART that is used as the signal combining means 41 of FIG. 1. As it is received, the signal of MARKS and SPACES representing a code character is stored in register 111. During this reception, control circuit 115 between register 111 and decoding stages 121, 122, disables the decoding stages thereby preventing the decoding of an incomplete signal. Control circuit 115 may simply be a lead to an array of AND gates in the decoding stages that disables the AND gates whenever register 111 is not full. Once a complete signal of MARKS and SPACES representative of a code character is stored in register 111, control circuit 115 enables the decoding stages and the different bits in the signal are simultaneously decoded. Each decoding stage converts an input on leads 117 to an output on one of leads 127 from the decoding stage.

Illustratively, each decoding stage is a SN 74154 circuit that translates an input signal on four input leads into an output signal on one of 16 output leads. Thus, four leads 117 from register 111 provide these input leads to decoding stage 121 and four more leads 117 provide the input leads to decoding stage 122. The SN 74154 circuit is a well-known logic circuit containing sixteen AND gates, each of which controls the output on one lead 127. The four input leads 117 are selectively connected to these gates in a analogous fashion to the connections made to the AND gates of each of the coding stages 31, 32 of FIG. 1. The output from each circuit is a signal at low logic on one of the 16 leads, the other fifteen leads being held at high logic. Because there are two decoding stages, up to 256 signal combinations representative of different characters can be recognized by this decoding apparatus.

Selected calling code characters are recognized by programming board 131 and character recognition circuit 141 which provide means for monitoring selected combinations of the outputs from decoding stages 121, 122. Specifically, for each character to be recognized, programming board 131 selects one lead 127 from decoding stage 121 and one lead 127 from decoding stage 122 and connects the pair of leads to outputs that are applied to the two input leads 137 of an AND gate 143 in character recognition circuit 141. Programming board 131 is similar in construction to coding matrices 21, 22. Advantageously, the board is a circuit board with leads 127 from decoding stages 121, 122 disposed on one side of leads 137 to recognition circuit 141 disposed on the other side. Again, selective connections between leads 127 and 137 are made through holes in the board. To facilitate the insertion of the coding matrix into the apparatus and its removal therefrom, connecting plugs 128, 138 may be provided in leads 127, 137, respectively.

As many different characters can be recognized as there are different pairs of leads from decoding stages 121, 122 and different AND gates 143. As in the case of the coding matrices, it is desirable from the manufacturing standpoint to provide as many different AND gates 143 in recognition circuit 141 as anyone would ever be likely to need and to connect only as many gates as are required for a particular customer's application.

The output of the AND gates 143 in recognition circuit 141 is then applied to output means 151. For the detection of calling codes, output means 151 is a sequencer which is a conventional device that consists essentially of a series of AND gates and delay devices. The output of the AND gate 143 that monitors the first character in the code is delayed in the sequencer and applied to an AND gate simultaneously with the output from the AND gate 143 that monitors the second character in the code. The output from this AND gate is then delayed and applied to another AND gate simultaneously with the output from the AND gate 143 that monitors the third character in the code; and so on. In this way, each AND gate 143 is read in sequence to determine if it has detected the particular code character represented by the pair of input leads to the AND gate. If the proper calling code has been received, the output of the sequencer turns on the station motor and transmits an answerback signal if the station is so equipped. Data communication may then commence. If a different calling code is received, at least one AND gate 143 will not have the proper output required to enable the associated AND gate in the sequencer. Consequently, the station motor will not be started and no data communication will be possible.

In addition to using the foregoing apparatus for the generation and detection of calling codes, it is also possible to use this apparatus for the coding of alphanumeric data into MARK and SPACE signals and for the decoding of such signals. In this case, the input 11 of FIG. 1 may be a teletypewriter, a tape reader, a computer, or any other means for generating signals. The remaining coding apparatus is the same as that shown in FIG. 1 with one possible exception. In generating the calling codes, two different input leads 17 may be used to produce outputs on the same pair of output leads 27 from the coding matrices 21, 22. This would be done if the same character, and therefore the same sequence of MARKS and SPACES, is used more than once in a calling code. If input 11, however, is a device such as a teletypewriter, each input lead 17 would ordinarily be connected to a different key of the typewriter and, therefore, should be connected to a different pair of output leads 27 in order to generate a different sequence of MARKS and SPACES.

The decoding apparatus that is used is also the same except for output means 151 which in this case might be the printer of a teletypewriter. Of course, there must be as many AND gates 143 in recognition circuit 141 as there are different characters to be detected. Again, each of the AND gates used to decode alphanumeric data would ordinarily be connected to a different pair of leads 127 while some of the AND gates used to detect a particular calling code would be connected to the same pair of leads if the same character was used more than once in a calling code.

As is evident, the connections made between leads 17 and leads 27 in coding matrices 21, 22 and those made between leads 127 and leads 137 in programming board 131 have to be related to one another so that a given input signal is reproduced at output means 145. The particular sequence of MARKS and SPACES that is used to code any particular input signal may, however, be selected by the user simply by making the appropriate connections between leads 17 and 27 in matrices 21, 22 and leads 127 and 137 in programming board 131. In addition, the sequences that are used to represent different characters may readily be varied simply by replacing one set of coding matrices and programming board with a different set. Thus, signal transmission can readily be "scrambled" and different scrambling devices can readily be used to provide a measure of security for data transmission in the system.

If desired, the applications of the coding and decoding apparatus for generation and detection of calling codes and for the coding and decoding of alphanumeric data can readily be combined. It is only necessary to provide appropriate input means for both generating the calling codes and for entering alphanumeric data into the coding apparatus. Similarly, apparatus for detecting the calling codes and decoding the MARK and SPACE signals must be provided. This can readily be done by using appropriate input means such as a commutator and a teletypewriter connected in parallel to leads 27 and appropriate output means such as a sequencer and teletypewriter connected in parallel to recognition circuit 141.

As will be evident, our invention may be practiced in many forms. If desired, additional coding matrices and code character generators can be connected in parallel to provide even greater selection of codes. Conversely, if only a small number of codes are desired, it may be practical to use only a single coding matrix and code character generator. This is particularly likely in the generation of calling codes where the number of characters in the calling code can be used to make up for any limitations in the total number of different code characters. Numerous other modifications can be made within the spirit and scope of the invention.

What is claimed is:

1. A method for coding and decoding signals used in communication between stations in a common communication system comprising the steps of:

a. at a first station, applying a first signal to a plurality of coding matrices, each of which comprises a first plurality of input leads, a second plurality of output leads and selective ohmic connections between said input leads and said output leads, by applying said signal to one input lead to each matrix;

b. applying the signal from each coding matrix to a code character generator that produces a different set of MARKS and SPACES for a signal on at least some of the different output leads from the coding matrix;

c. at a second station, applying a first portion of the sets of MARKS and SPACES from the coding matrices of the first station to a first decoding stage and applying a second portion of the sets of MARKS and SPACES to a second decoding stage, each of which converts a signal of MARKS and SPACES into an output on one of a plurality of leads;

d. monitoring the output of selected leads from the decoding stages for the coincidence of a signal on a selected lead from the first decoding stage and a selected lead from the second decoding stage; and e. producing an output signal when said coincidence is detected.

2. The method of claim 1 wherein steps (a)–(e) are repeated for a second signal that is applied to the coding matrices of the first station on different input leads.

3. The method of claim 2 wherein at least one of the leads monitored at the second station during the second execution of step (d) is different from the leads monitored during the first execution of step (d).

4. A method for forming calling codes used in establishing communication between at least two of a plurality of stations in a common communication system comprising the steps of:

connecting between a signal source and a code character generator a first coding matrix comprising at least one input lead, a plurality of output leads and selective ohmic connections between said input lead and said output leads, said code character generator producing a different set of MARKS and SPACES for a signal on at least some of the different output leads from the coding matrix;

applying to an input lead to the first coding matrix a signal from said signal source that is connected by the matrix to at least one output lead and is applied to the code character generator to produce a first set of MARKS and SPACES constituting a first code character;

replacing said first coding matrix with a second coding matrix similar to the first but having different selective ohmic connections; and applying to an input lead to the second coding matrix a signal from said signal source that is connected by the matrix to at least one output lead and is applied to the code character generator to produce a second set of MARKS and SPACES constituting a second code character.

5. The method of claim 4 wherein at least one of the coding matrices has a plurality of input leads and the step of applying a signal to an input lead of said coding matrix comprises the step of applying a signal successively to each of a plurality of input leads to said coding matrix, whereby the code character generator produces a plurality of sets of MARKS and SPACES constituting a plurality of code characters in a calling code.

6. A method for forming calling codes used in establishing communication between at least two of a plurality of stations in a common communication system comprising the steps of:

connecting between a signal source and at least two code character generators first connecting means comprising at least one input lead, a plurality of output leads and selective ohmic connections between said input lead and both one of the output leads connected to a first code character generator and one of the output leads connected to a second code character generator, each code character generator producing a different set of MARKS and SPACES for a signal on at least some of the different output leads from the coding matrix;

applying to an input lead to the first connecting means a signal from said signal source that is applied to said code character generators to produce a first group of sets of MARKS and SPACES constituting a first code character in a first calling code;

replacing said first connecting means with a second connecting means similar to the first but having different selective ohmic connections; and applying to an input lead to the second connecting means a signal from said signal source that is applied to said code character generators to produce a second group of sets of MARKS and SPACES constituting a second code character in a second calling code.

7. The method of claim 6 wherein at least one of the connecting means has a plurality of input leads and the step of applying a signal to an input lead of said connecting means comprises the step of applying a signal successively to each of a plurality of input leads to said connecting means, whereby the code character generators produce a plurality of groups of sets of MARKS and SPACES constituting a plurality of code characters in a calling code.

8. In a communication system in which coded signals in the form of MARKS and SPACES are transmitted from one station and received by another, apparatus at the transmitting station comprising:

at least two programmable coding matrices, each matrix comprising a first plurality of input leads, a second plurality of output leads, and selective ohmic connections between said input leads and said output leads;

an input means for applying signals on a plurality of sets of leads, one lead of each set being an input lead to one coding matrix and another lead being an input lead to another coding matrix; and a code character generator connected to the plurality of output leads from each coding matrix, each generator producing a different set of MARKS and SPACES for a signal on at least some of the different leads from the coding matrix to which it is connected, said input means, coding matrices, and code character generators producing at the output of the character generators a different group of MARKS and SPACES for signals on at least some of the different sets of leads from the input means; and apparatus at the receiving station comprising:

at least two decoding stages, each of which converts a portion of a received group of MARKS and SPACES into an output on one of a plurality of leads;

means for monitoring at least one set of selected leads for the coincidence of a signal thereon, one lead of each set being connected to a lead from one decoding stage and another lead being connected to a lead from another decoding stage, whereby the presence of a particular character in the coded signal may be determined; and programmable means for selectively connecting the plurality of leads from each decoding stage to the set of leads to the monitoring means.

9. The apparatus of claim 8 wherein each input lead in a coding matrix that is connected to an output lead is connected to only one such output lead and a different set of MARKS and SPACES are provided by the code character generator for a signal on each different lead from the coding matrix.

10. The apparatus of claim 8 wherein the monitoring means in the receiving station monitors a plurality of sets of selected leads, whereby the presence of a plurality of characters in the coded signal may be determined.

11. The apparatus of claim 10 wherein the monitoring means further comprises a first set of logic gates each of which monitors a set of selected leads and logic means for producing a signal in response to signals from all of said logic gates, whereby a received calling code may be recognized.

12. The apparatus of claim 8 wherein the transmitting apparatus further comprises a parallel-to-serial converter for combining the sets of MARKS and SPACES produced in each code character generator in response to an input signal on a set of input leads to the coding matrices.

13. The apparatus of claim 8 wherein the input means comprises a commutator that applies signals successively to each of a first plurality of sets of input leads, whereby there is produced at the output of the character generators a plurality of groups of MARKS and SPACES constituting a calling code.

* * * * *

UNITED STATES PATENT OFFICE
CERTIFICATE OF CORRECTION

Patent No. 3,815,092 Dated June 4, 1974

Inventor(s) Richard D. Stephenson

It is certified that error appears in the above-identified patent and that said Letters Patent are hereby corrected as shown below:

Column 6, line 36, "side of leads" should read --side and leads --.

Column 10, line 40, "SPACES are provided" should read -- SPACES are produced --.

Signed and sealed this 29th day of October 1974.

(SEAL)
Attest:

McCOY M. GIBSON JR.
Attesting Officer

C. MARSHALL DANN
Commissioner of Patents